(12) United States Patent
Song et al.

(10) Patent No.: US 8,033,141 B2
(45) Date of Patent: Oct. 11, 2011

(54) METHOD OF MANUFACTURING OPTICAL FIBER

(75) Inventors: Minsuk Song, Tokyo (JP); Shinichi Arai, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 657 days.

(21) Appl. No.: 12/040,236

(22) Filed: Feb. 29, 2008

(65) Prior Publication Data

US 2008/0216516 A1 Sep. 11, 2008

(30) Foreign Application Priority Data

Mar. 5, 2007 (JP) ................................. 2007-054764

(51) Int. Cl.
*C03B 37/025* (2006.01)
(52) U.S. Cl. .......................................... 65/402; 65/435
(58) Field of Classification Search .................... 65/435, 65/402
See application file for complete search history.

(56) References Cited

U.S. PATENT DOCUMENTS 5,298,047 A  3/1994  Hart, Jr. et al.

FOREIGN PATENT DOCUMENTS

| JP | 6-171970 | 6/1994 |
|---|---|---|
| JP | 2003-146689 | 5/2003 |
| JP | 2004-123527 | 4/2004 |
| JP | 2004-345947 | 12/2004 |
| JP | 2006-315913 | 11/2006 |
| JP | 2009-520996 | 5/2009 |

OTHER PUBLICATIONS

U.S. Appl. No. 12/408,805, filed Mar. 23, 2009, Song.
Japanese Office Action mailed Aug. 2, 2011, in Japan Patent Application No. 2007-054764, filed Mar. 5, 2007(with English-language Translation).

*Primary Examiner* — Queenie Dehghan
(74) *Attorney, Agent, or Firm* — Oblon, Spivak, McClelland, Maier & Neustadt, L.L.P.

(57) ABSTRACT

A coating is applied on an optical fiber drawn from a melted tip of an optical-fiber preform. A glass spin is applied to a coated optical fiber by gripping the coated optical fiber with at least a pair of spinning applying rollers arranged in different levels with parallel rotation axes, rotating the spinning applying rollers so that the coated optical fiber is guided in a predetermined direction, and alternately shifting the spinning applying rollers in opposite directions along the rotation axes. The glass spin is applied to the coated optical fiber in a state in which each of the rotation axes is tilted at a predetermined angle from a plane perpendicular to the first direction.

4 Claims, 5 Drawing Sheets

METHOD OF MANUFACTURING OPTICAL FIBER

BACKGROUND OF THE INVENTION

1. Field of the Invention

The present invention relates to a technology for manufacturing an optical fiber.

2. Description of the Related Art

An optical fiber is generally manufactured from an optical-fiber preform set in a draw furnace of a draw tower. Specifically, the distal end of the optical-fiber preform is heated to be melted to draw the optical fiber, and a single-layer or a multilayer ultraviolet (UV) curable resin and the like is applied on the optical fiber, fabricating a coated optical fiber.

In the above manufacturing process, it is extremely difficult to form perfectly circular core and cladding in a concentric manner in the longitudinal direction of the optical fiber; and therefore, a typical cross section of the core or the cladding is elliptical or distorted, or the core and the cladding are formed in an eccentric manner. Such imperfections cause difference between propagation velocities of lights propagating in two different polarization modes through the optical fiber, causing large polarization mode dispersion (PMD). If an optical fiber with large PMD is used as a transmission line for an optical-fiber communication, various problems may be induced.

Japanese Patent Application Laid-open No. H6-171970 and Japanese Patent Application Laid-open No. 2003-146689 disclose conventional technologies for reducing the PMD in an optical fiber. Specifically, the PMD is reduced by periodically applying the same amount of glass spin in the clockwise direction and the counterclockwise direction to a coated optical fiber.

However, when the glass spin is applied to an optical fiber in the conventional technologies, a residual torsional stress in either of the directions may be present on the optical fiber. Hereafter it is called "mechanical twist" in this specification. If the mechanical twist is present, the PMD in the optical fiber may increase more than that without the glass spin. Furthermore, the mechanical twist is a torsional stress with an intrinsic stress acting against the residual stress. Therefore, if an optical fiber having the mechanical twist is used for manufacturing an optical-fiber ribbon, the optical fiber may be curled, causing degradation of operation efficiency.

A conventional technology for reducing the mechanical twist is disclosed in Japanese Patent Application Laid-open No. 2006-315913. Specifically, after applying a glass spin to a coated optical fiber, a glass spin in a direction opposite to a direction of the mechanical twist is further applied to the optical fiber to reduce the mechanical twist.

Recently, a transmission speed in an optical fiber communication is increasing, requiring more reduction of the PMD in an optical fiber of a transmission line.

However, it is difficult, in the conventional technology, to sufficiently reduce the mechanical twist in the longitudinal direction of an optical fiber. Consequently, the PMD is not sufficiently reduced with the conventional technology.

SUMMARY OF THE INVENTION

It is an object of the present invention to at least partially solve the problems in the conventional technology.

According to an aspect of the present invention, there is provided a method of manufacturing an optical fiber including drawing an optical fiber from a melted tip of an optical-fiber preform; forming a coated optical fiber by applying a coating on an outer circumference of the optical fiber drawn at the drawing; and applying a glass spin to the coated optical fiber by gripping the coated optical fiber with at least a pair of spinning applying rollers arranged in different levels with parallel rotation axes across the coated optical fiber, rotating the spinning applying rollers so that the coated optical fiber is guided in a first direction, and alternately shifting the spinning applying rollers in directions opposite to each other along the rotation axes. The applying includes applying the glass spin to the coated optical fiber in a state in which each of the rotation axes is tilted at a predetermined angle from a plane perpendicular to the first direction.

Furthermore, according to another aspect of the present invention, there is provided a method of manufacturing an optical fiber including drawing an optical fiber from a melted tip of an optical-fiber preform; forming a coated optical fiber by applying a coating on an outer circumference of the optical fiber drawn at the drawing; and applying a glass spin to the coated optical fiber by causing the coated optical fiber to make a contact with a surface of an oscillating roller, rotating the oscillating roller around its rotation axis so that the coated optical fiber is guided in a first direction, and oscillating the rotation axis of the oscillating roller periodically centering around a second direction tilted at a predetermined angle from a plane perpendicular to the first direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited to the below embodiments.

Figure 1:
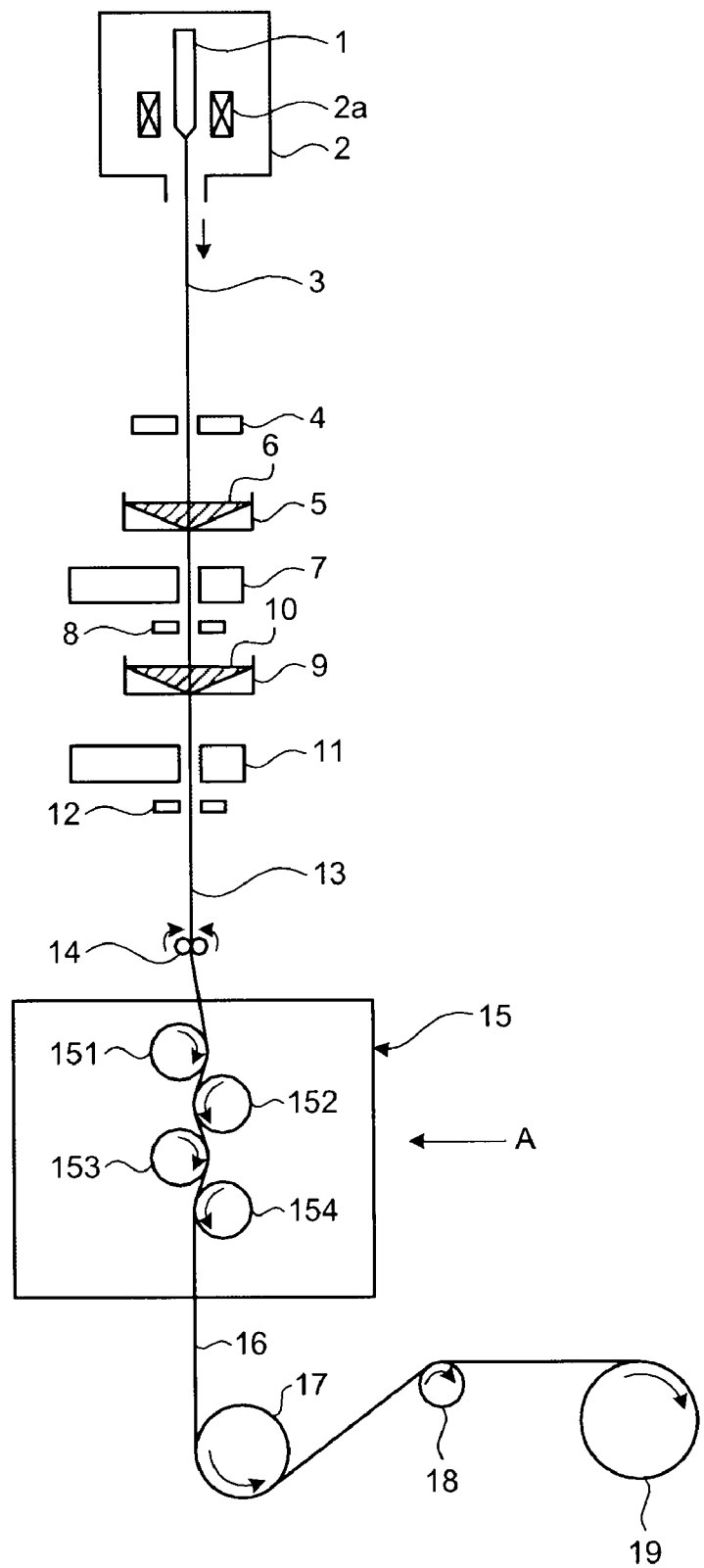
FIG. 1 is a schematic diagram for explaining a method of manufacturing an optical fiber according to a first embodiment of the present invention.

FIG. 1 is a schematic diagram for explaining a method of manufacturing an optical fiber according to a first embodiment of the present invention.

An optical-fiber preform 1 is set in a draw furnace 2, and a distal end of the optical-fiber preform 1 is heated to be melted by a heater 2a, and thereby an optical fiber 3 is drawn in a vertically downward direction. A diameter measuring device 4 monitors an outer diameter of the optical fiber 3. A coating device 5 applies ultraviolet (UV) curable resin 6 on the outer surface of the optical fiber 3. A UV applying device 7 applies UV to the optical fiber 3, so that the UV curable resin 6 is cured, forming a primary coating layer on the optical fiber 3. A diameter measuring device 8 monitors an outer diameter of the optical fiber 3 coated with the primary coating layer. A coating device 9 applies UV curable resin 10 on the primary coating layer. Then, a UV applying device 11 applies UV to the optical fiber 3, so that the UV curable resin 10 is cured, forming a secondary coating layer on the primary coating layer. Thus, a coated optical fiber 13 is obtained. A diameter measuring device 12 monitors an outer diameter of the coated optical fiber 13. The number of coating layers to be formed on the optical fiber 3 can be determined depending on how the coated optical fiber 13 is used. Accordingly, coating devices, UV applying devices, and diameter measuring devices can be arranged depending on the number of coating layers to be formed.

It is also possible to apply and cure a plurality of coating layers at one time.

A guide roller 14 guides the coated optical fiber 13 to a spinning mechanism 15. The spinning mechanism 15 applies glass spin to the coated optical fiber 13 thereby forming a glass spin-applied optical fiber 16. Guide rollers 17, 18 guide the glass spin-applied optical fiber 16 to a take-up spool 19. The take-up spool 19 winds the glass spin-applied optical fiber 16 around a bobbin in an appropriate size.

Figure 2:
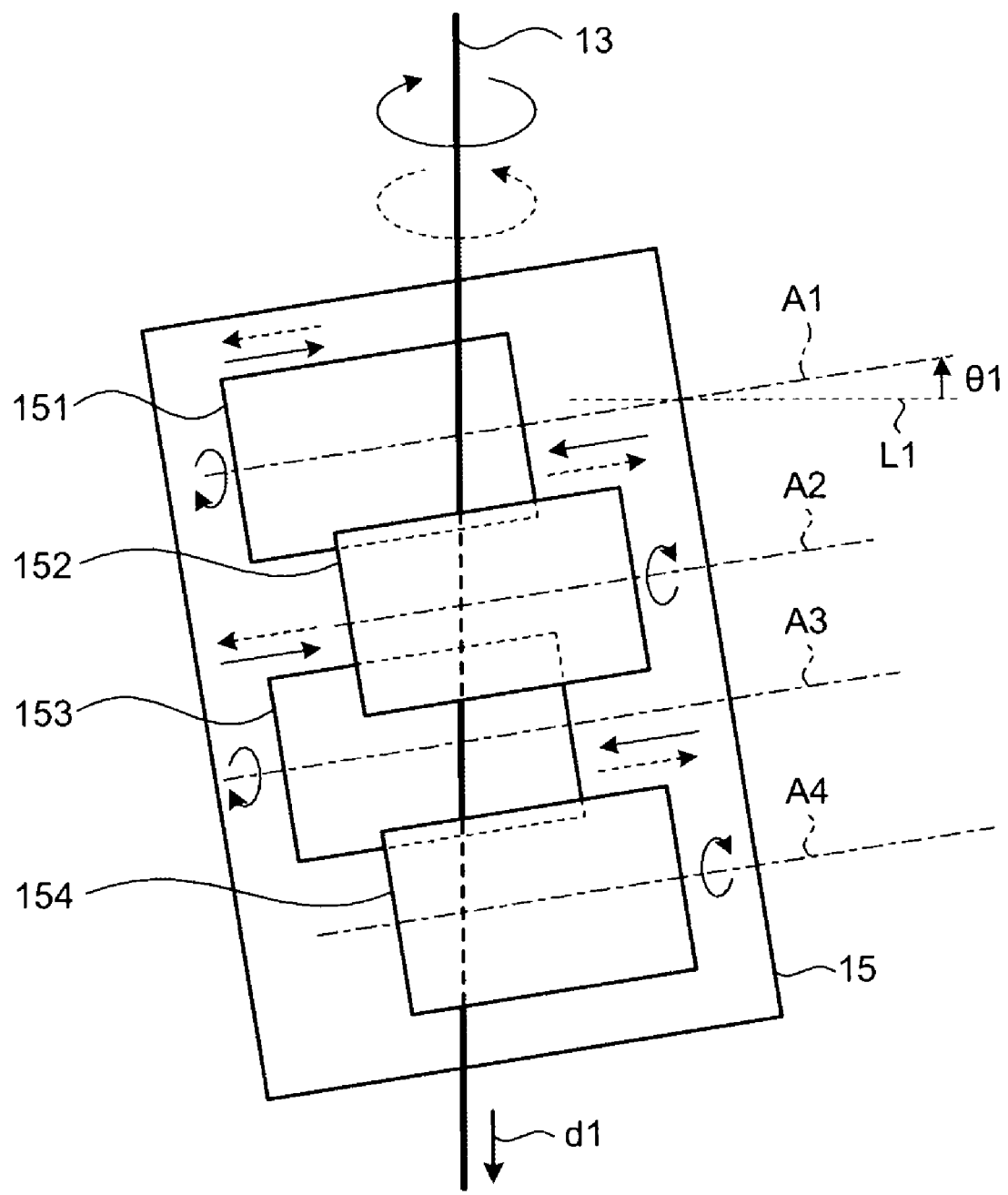
FIG. 2 is a side view of a spinning applying mechanism viewed in a direction of an arrow A shown in FIG. 1.

FIG. 2 is a side view of the spinning mechanism 15 viewed in a direction of an arrow A shown in FIG. 1. The spinning mechanism 15 includes spinning rollers 151 to 154. The spinning rollers 151 to 154 are sequentially arranged in an asymmetric manner along a draw direction of an optical fiber so that axes of rotation A1 to A4 are kept parallel to each other. The spinning mechanism 15 leads the coated optical fiber 13 to be sandwiched between adjacent two of the spinning rollers 151 to 154 while rotating around the axes of rotation A1 to A4 thereby guiding the coated optical fiber 13 in a direction d1, which is substantially the same as the vertically downward direction. As represented by arrows in FIG. 1, the spinning rollers 151, 153 rotate in the clockwise direction while the spinning rollers 152, 154 rotate in the counterclockwise direction.

The spinning mechanism 15 alternately shifts the spinning rollers 151, 153 in one direction and the opposite direction along the respective axes of rotation A1, A3. At the same time, the spinning mechanism 15 alternately shifts the spinning rollers 152, 154 in directions opposite to those of the spinning rollers 151, 153 along the respective axes of rotation A2, A4. Consequently, glass spins of the same amounts and in opposite directions are applied to the coated optical fiber 13 by the spinning rollers 151 to 154.

Specifically, if the spinning rollers 151 to 154 are shifted toward the coated optical fiber 13 as represented by solid-line arrows shown in FIG. 2, the coated optical fiber 13 rotates in the clockwise direction along the direction d1. As a result, clockwise glass spin is applied to the coated optical fiber 13. On the other hand, by shifting the spinning rollers 151 to 154 away from the coated optical fiber 13 as represented by dotted-line arrows shown in FIG. 2, the coated optical fiber 13 rotates in the counterclockwise direction along the direction d1. As a result, counterclockwise glass spin is applied to the coated optical fiber 13.

The spinning rollers 151 to 154 are arranged in such a manner that they are tilted from a plane perpendicular to the direction d1, making it possible to apply further glass spin to the coated optical fiber 13. Specifically, as shown in FIG. 2, the spinning rollers 151 to 154 are arranged in such a manner that each of the axes of rotation A1 to A4 is tilted at an angle of $\theta 1$ in the counterclockwise direction from a line L1 corresponding to a plane perpendicular to the direction d1. Thus, further glass spin can be applied to the coated optical fiber 13 depending on tilt of the axes of rotation A1 to A4 at an angle of $\theta 1$ in addition to glass spin applied by alternately shifting the spinning rollers 151 to 154.

Upon applying glass spin to the coated optical fiber 13 by alternately shifting the spinning rollers 151 to 154, imbalance may occur between the amounts of glass spin in the clockwise direction and in the counterclockwise direction, causing mechanical twist on the coated optical fiber 13. Examples of cause of such imbalance include slip of the coated optical fiber 13 along the outer surface of the spinning rollers 151 to 154 and even a slight displacement of the spinning rollers 151 to 154. However, according to the first embodiment, glass spin can be applied to the coated optical fiber 13 by tilting the axes of rotation A1 to A4 at a predetermined angle as well as by alternately shifting the spinning rollers 151 to 154. Thus, it is possible to prevent occurrence of mechanical twist by changing an angle of tilt of the axes of rotation A1 to A4.

The conventional technology disclosed in the Japanese Patent Application Laid-open No. 2006-315913 is for correcting and reducing mechanical twist present on a coated optical fiber. On the other hand, the technology described in the first embodiment is for tilting a spinning mechanism to prevent occurrence of mechanical twist in the spinning mechanism. Therefore, it is possible to effectively prevent imbalance of amounts of glass spin in the longitudinal direction of a coated optical fiber. Furthermore, the amount of glass spin to be adjusted by an angle of tilt is substantial. Therefore, an adjustable range of mechanical twist can be widened. Moreover, slight tilt of a spinning mechanism can be enough for adjusting mechanical twist. Consequently, it is possible to suppress occurrence of slip of the coated optical fiber 13 along the outer surfaces of the spinning rollers 151 to 154 even when a draw speed of the coated optical fiber 13 increases. Thus, it is possible to increase the draw speed.

Figure 3A:
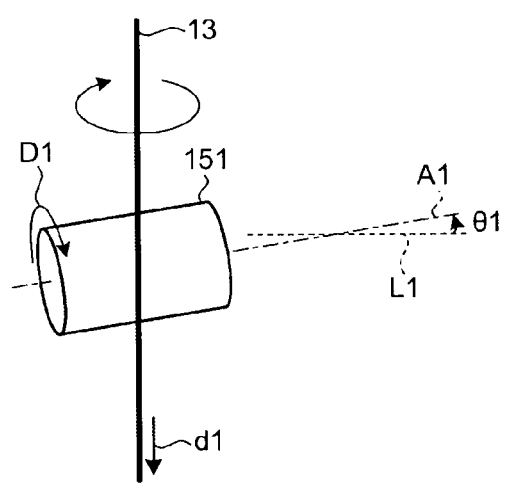
FIGS. 3A to 4B are schematic diagrams for explaining relation between tilt of a pair of spinning applying rollers and glass spin to be applied to a coated optical fiber depending on the tilt according to the first embodiment.
Figure 3B:
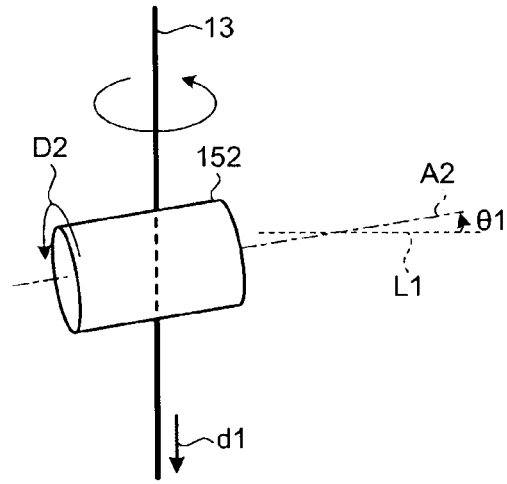

FIGS. 3A to 4B are schematic diagrams for explaining relation between tilt of a pair of the spinning rollers 151, 152 and glass spin to be applied to the coated optical fiber 13 depending on the tilt. As shown in FIG. 3A, when the spinning roller 151 is arranged in such a manner that the axis of rotation A1 is tilted at an angle of $\theta 1$ in the counterclockwise direction from the line L1, and rotates in a direction represented by an arrow D1, clockwise glass spin is applied to the coated optical fiber 13. On the other hand, as shown in FIG. 3B, when the spinning roller 152 is arranged in such a manner that the axis of rotation A2 is tilted at an angle of $\theta 1$ in the counterclockwise direction from the line L1, and rotates in a direction represented by an arrow D2, counterclockwise glass spin is applied to the coated optical fiber 13.

As described above, when the spinning rollers 151, 152 are tilted, glass spin in one direction and glass spin in the opposite direction can be applied to the coated optical fiber 13. At this state, the spinning rollers 151, 152 are arranged in a stepwise manner so that the spinning roller 151 is closer to the guide roller 14 of which placement is fixed. Therefore, the coated optical fiber 13 is more likely to slip along the outer surface of the spinning roller 151. The coated optical fiber 13 is in contact with the outer surface of the spinning roller 152 in a longer length than with the spinning roller 151. Therefore, the spinning roller 152 applies larger amount of counterclockwise glass spin to the coated optical fiber 13 than the amount of clockwise glass spin applied by the spinning roller 151. As a result, the coated optical fiber 13 is spun in the counterclockwise direction.

The spinning roller 153 applies glass spin, to the coated optical fiber 13, of substantially the same amount and in the opposite direction applied by the spinning roller 152. The guide roller 17 arranged in the downstream side of the spinning mechanism 15 hardly affects glass spin. Therefore, the spinning roller 154 applies glass spin, to the coated optical fiber 13, of substantially the same amount and in the same direction applied by the spinning roller 152. As a result, if the spinning rollers 151 to 154 are tilted at an angle of θ1 in the counterclockwise direction from the line L1, the coated optical fiber 13 is spun in the counterclockwise direction. If the angle of tilt increases, the amount of glass spin to be applied increases.

Figure 4A:
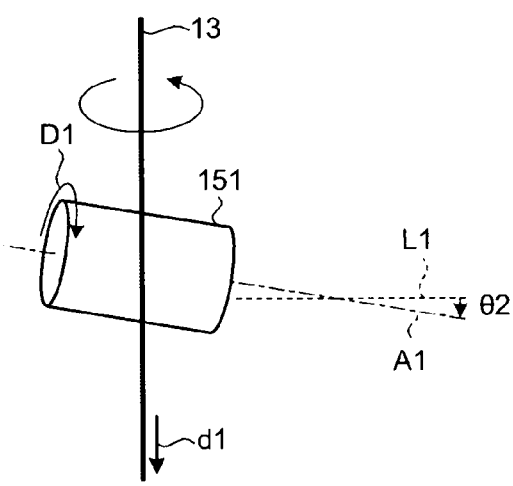
Figure 4B:
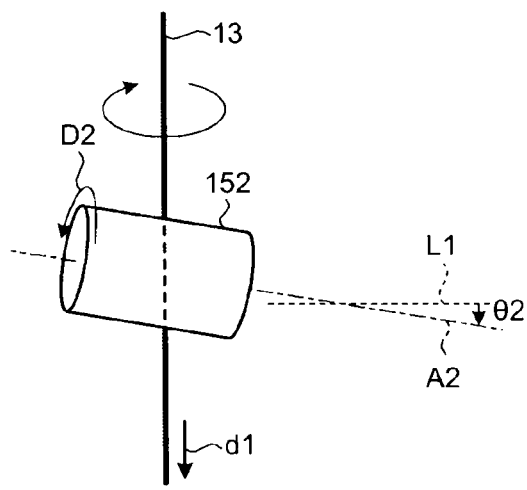

Alternatively, as shown in FIG. 4A, when the spinning roller 151 is arranged in such a manner that the axis of rotation A1 is tilted at an angle of θ2 in the clockwise direction from the line L1, and rotates in a direction represented by the arrow D1, counterclockwise glass spin is applied to the coated optical fiber 13. On the other hand, as shown in FIG. 4B, when the spinning roller 152 is arranged in such a manner that the axis of rotation A2 is tilted at an angle of θ2 in the clockwise direction from the line L1, and rotates in a direction represented by the arrow D2, clockwise glass spin is applied to the coated optical fiber 13. As a result, in the above similar manner, larger amount of clockwise glass spin is applied to the coated optical fiber 13 by the spinning roller 152 than the amount of counterclockwise glass spin applied by the spinning roller 151. Thus, the coated optical fiber 13 is spun in the clockwise direction.

At this state, similar to the above, the spinning roller 153 applies glass spin, to the coated optical fiber 13, of substantially the same amount and in the opposite direction applied by the spinning roller 152. Furthermore, the spinning roller 154 applies glass spin, to the coated optical fiber 13, of substantially the same amount and in the same direction applied by the spinning roller 152. Thus, if the spinning rollers 151 to 154 are tilted at an angle of θ2 in the clockwise direction from the line L1, the coated optical fiber 13 is spun in the clockwise direction.

As described above, by adjusting a direction and an angle of tilting the axes of rotation A1 to A4 of the spinning rollers 151 to 154, it is possible to adjust a direction and an amount of glass spin to be applied to the coated optical fiber 13. Thus, it is possible to make adjustment so that mechanical twist does not occur in the spinning mechanism 15.

A direction and an angle of the above tilt are determined in the manner described below. At the beginning of manufacturing, a manufacturing of the glass spin-applied optical fiber 16 on a trial basis without tilting the spinning rollers 151 to 154, and a measuring of directions and amounts of mechanical twist present in the glass spin-applied optical fiber 16 are performed for a predetermined number of times, and an average amount and an average direction are calculated from measured values. A direction and an angle of tilt are determined to remove mechanical twist of the average amount and in the average direction.

The axes of rotation A1 to A4 of the spinning rollers 151 to 154 are then tilted at the determined angel. An angle of tilt can be adjusted either by tilting each of the spinning rollers 151 to 154 or by tilting the spinning mechanism 15 itself as shown in FIG. 2. The adjusted angle of tilt are maintained during fabrication of the glass spin-applied optical fiber 16. It is possible to make fine adjustment of an angle and a direction of tilt. For example, upon taking up a bobbin with the wound glass spin-applied optical fiber 16 from the take-up spool 19, it is possible to take a predetermined length of the end portion of the wound glass spin-applied optical fiber 16 as a sample to measure an amount and a direction of mechanical twist. If a measured amount and a direction are different from the averages, an angle and a direction of tilt are adjusted.

Furthermore, it is possible to measure an angle and a mechanical twist during manufacturing of the glass spin-applied optical fiber 16, and thereby measured values are fed back to the spinning mechanism 15 to adjust an angle and a direction of tilt.

An amount of glass spin to be applied and an amount of mechanical twist are measured based on the number of glass spin (turns) applied to an optical fiber of one meter, and the number of mechanical twist present on an optical fiber of 1 meter. For example, if a period of glass spin is one meter, the amount of glass spin is represented by 1 turn/m. At this state, clockwise glass spin is represented by +1 turn/m while counterclockwise glass spin is represented by −1 turn/m.

A comparison test was performed as follows. Measured values of mechanical twist in the technology of the first embodiment were compared with those in the conventional technology disclosed in the Japanese Patent Application Laid-open No. 2006-315913. At this state, in the technology of the first embodiment, apparatuses A, B configured in the same manners as an optical-fiber manufacturing apparatus shown in FIG. 1 were used. On the other hand, in the conventional technology, the same apparatuses A, B were used; however, a spinning mechanism was not tilted, and the guide roller 17 was alternatively tilted in the manner disclosed in the above document to remove mechanical twist. An amount of glass spin to be applied was ten times, i.e., 10 turns/m, while the number of samples "n" for measuring mechanical twist was thirty.

As a result of the above test, an optical fiber obtained by the conventional technology was in such a condition that an average of mechanical twist was −0.1 turn/m, and a standard deviation "s" of mechanical twist in the apparatus A was 0.13 while the one in the apparatus B was 0.14. On the other hand, an optical fiber obtained by the technology of the first embodiment was in such a condition that an average of mechanical twist was 0.0 turn/m, and a standard deviation "s" of mechanical twist was 0.11 in both of the apparatuses A, B. Thus, the average of amounts of mechanical twist and variation in the amounts of mechanical twist were reduced by the technology of the first embodiment.

According to the first embodiment, it is possible to reduce an amount of mechanical twist of an optical fiber and variation in the amount of mechanical twist. As a result, an optical fiber with less mechanical twist and less PMD can be manufactured in a stable manner.

Figure 5:
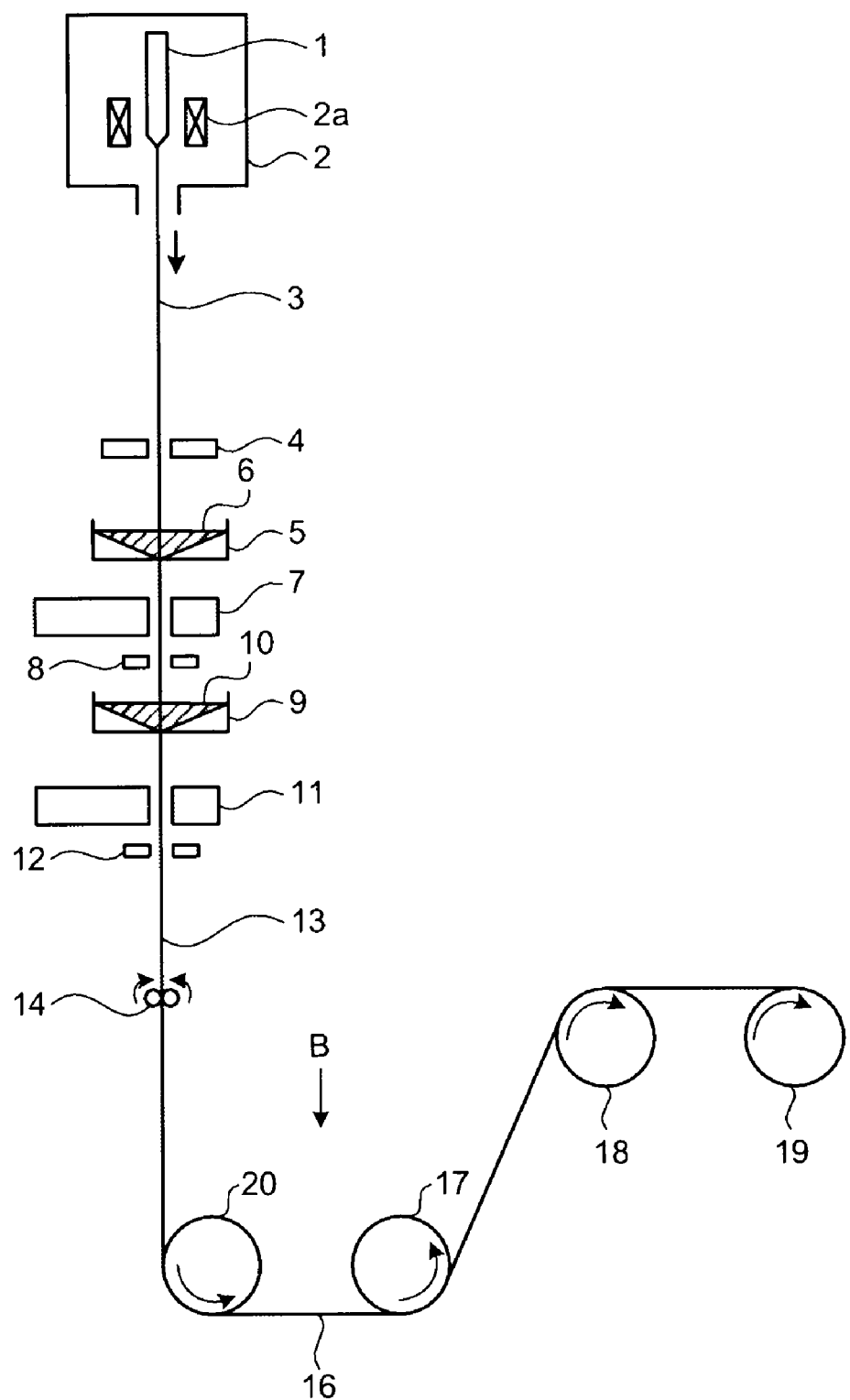
FIG. 5 is a schematic diagram for explaining a method of manufacturing an optical fiber according to a second embodiment of the present invention.

FIG. 5 is a schematic diagram for explaining a method of manufacturing an optical fiber according to a second embodiment of the present invention.

Processes from the beginning of manufacturing, which starts by setting the optical-fiber preform 1 in the draw furnace 2 to heat the optical-fiber preform 1 to be melted and thereby the optical fiber 3 is drawn, to monitoring of an outer diameter of the coated optical fiber 13 by the diameter measuring device 12 are the same as those described in the first embodiment, and the same explanations are not repeated.

The guide roller 14 guides the coated optical fiber 13 to an oscillating roller 20. The oscillating roller 20 applies glass spin to the coated optical fiber 13. The guide rollers 17, 18 guides the glass spin-applied optical fiber 16 to the take-up spool 19, and the take-up spool 19 winds the glass spin-applied optical fiber 16 around a bobbin in an appropriate size.

Figure 6:
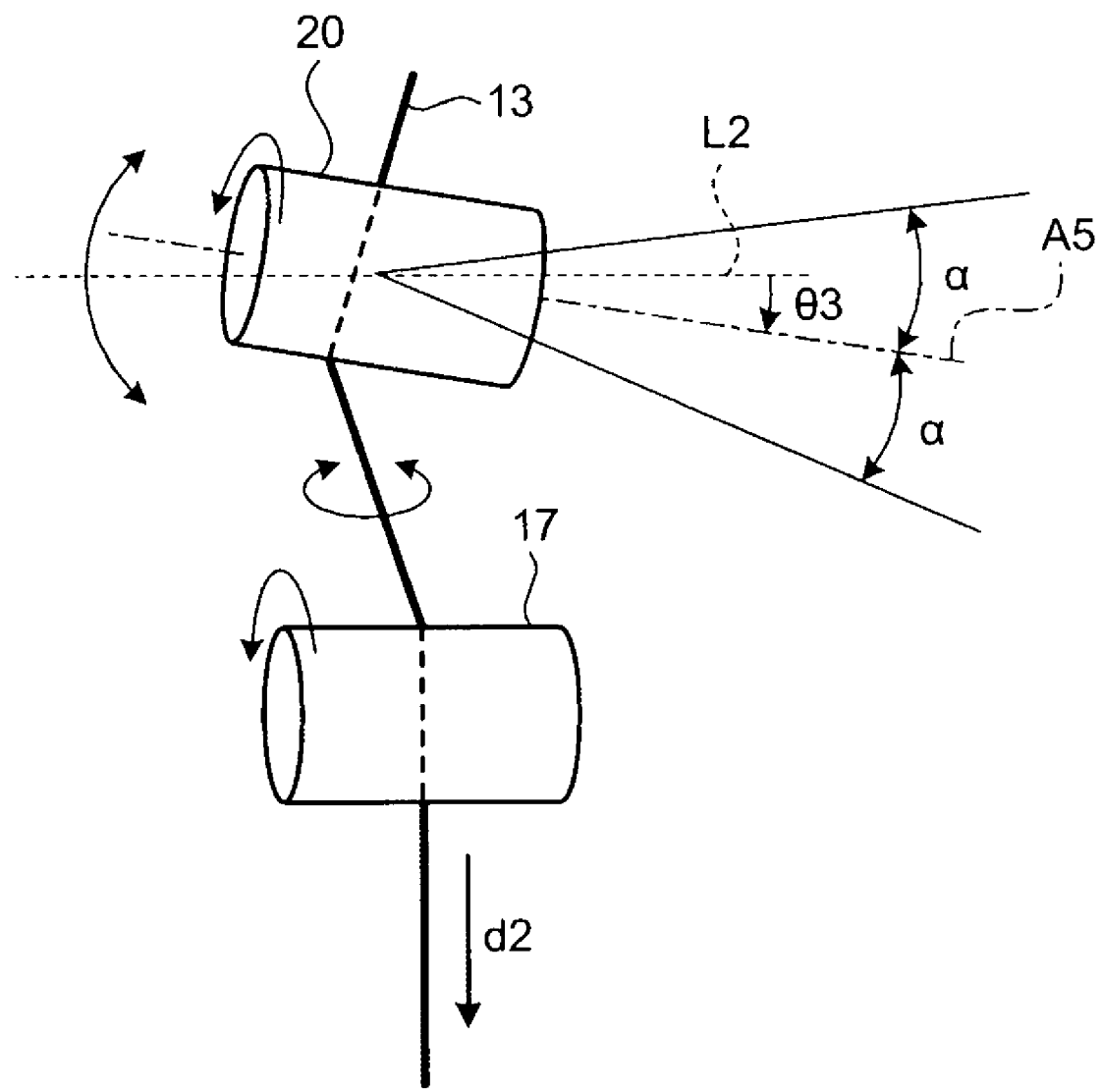
FIG. 6 is a side view of an oscillating roller and a guide roller viewed in a direction of an arrow B shown in FIG. 5.

FIG. 6 is a side view of the oscillating roller 20 and the guide roller 17 viewed in a direction of an arrow B shown in FIG. 5. The oscillating roller 20 is configured so that its outer surface comes contact with the coated optical fiber 13 while rotating around an axis of rotation A5 thereby guiding the coated optical fiber 13 in a direction d2. As shown in FIG. 5, the oscillating roller 20 rotates in the counterclockwise direction. The guide roller 17 is configured so that its outer surface comes contact with the glass spin-applied optical fiber 16 while rotating around an axis of rotation of the guide roller 17 thereby guiding the glass spin-applied optical fiber 16 in the direction d2. The direction d2 corresponds to a direction perpendicular to the axis of rotation of the guide roller 17.

At the same time, the axis of rotation A5 of the oscillating roller 20 periodically oscillates upward and downward at an angle of α from a predetermined plane. The predetermined plane is the one that is tilted in the clockwise direction at an angle of θ3 from a line L2 corresponding to a plane perpendicular to the direction d2. Specifically, the axis of rotation A5 of the oscillating roller 20 periodically oscillates in the counterclockwise direction at an angle of (α−θ3) from the line L2 and in the clockwise direction at an angle of (α+θ3) from the line L2. As a result, glass spin can be applied to the coated optical fiber 13.

If the axis of rotation A5 of the oscillating roller 20 is tilted in the clockwise direction from the line L2, clockwise glass spin is applied to the coated optical fiber 13. On the other hand, if the axis of rotation A5 of the oscillating roller 20 is tilted in the counterclockwise direction from the line L2, counterclockwise glass spin is applied to the coated optical fiber 13. According to the second embodiment, the axis of rotation A5 is tilted in the clockwise direction from the line L2 as shown in FIG. 6, and thereby clockwise glass spin is applied to the coated optical fiber 13 per period of oscillation of the oscillating roller 20.

Alternatively, when the axis of rotation A5 of the oscillating roller 20 periodically oscillates upward and downward at an angle of α from a plane tilted in the counterclockwise direction at an angle of θ3 from the line L2, the axis of rotation A5 of the oscillating roller 20 periodically oscillates in the counterclockwise direction at an angle of (α+θ3) from the line L2 and in the clockwise direction at an angle of (α−θ3) from the line L2. In this case, counterclockwise glass spin is applied to the coated optical fiber 13 per period of oscillation of the oscillating roller 20.

As described above, it is possible to adjust a direction and an amount of glass spin to be applied to the coated optical finer 13 by adjusting a direction and an angle of tilt of the axis of rotation A5 of the oscillating roller 20. Therefore, it is possible to make adjustment to prevent mechanical twist by the oscillating roller 20.

That is, an oscillating roller serving as a spinning mechanism is tilted to prevent mechanical twist, resulting in effectively prevent variation in amounts of mechanical twist in the longitudinal direction of a coated optical fiber.

According to the second embodiment, it is possible to reduce an amount of mechanical twist of an optical fiber and variation in the amount of mechanical twist. As a result, an optical fiber with less mechanical twist and less PMD can be manufactured in a stable manner.

It is also possible to add processes for correcting glass spin as disclosed in the Japanese Patent Application Laid-open No. 2006-315913 to the processes described in the first and the second embodiments. For example, the guide roller 17 can serve as such a roller that corrects mechanical twist.

Specifically, as previously described, the guide roller 17 is configured so that its outer surface comes contact with the glass spin-applied optical fiber 16 while rotating around an axis of rotation of the guide roller 17 thereby guiding the glass spin-applied optical fiber 16 in the direction d2. At this state, if an axis of rotation of the guide roller 17 is tilted from a plane perpendicular to the direction d2, it is possible to apply glass spin in a direction opposite to a direction of mechanical twist present in the glass spin-applied optical fiber 16. Thus, it is possible to use the guide roller 17 to make fine adjustment of glass spin in addition to main adjustment of reducing mechanical twist by the spinning mechanism 15. As a result, it is possible to make much optimal adjustment, thereby reducing more amounts of mechanical twist and variation in the amounts.

As described above, according to an aspect of the present invention, it is possible to reduce an amount of mechanical twist and variation in the amount of mechanical twist present in an optical fiber. Therefore, it is possible to manufacture an optical fiber with less mechanical twist and less PMD in a stable manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing an optical fiber, comprising:
   drawing an optical fiber from a melted tip of an optical-fiber preform;
   forming a coated optical fiber by applying a coating on an outer circumference of the optical fiber drawn at the drawing; and
   applying a glass spin to the coated optical fiber by
      gripping the coated optical fiber with at least a pair of spinning applying rollers with parallel rotation axes across the coated optical fiber, wherein the pair of spinning applying rollers are arranged at different levels relative to each other in a first direction that the optical fiber is guided in,
      rotating the spinning applying rollers so that the coated optical fiber is guided in the first direction; and
      alternately shifting the spinning applying rollers in directions opposite to each other along the rotation axes, wherein
   the applying includes applying the glass spin to the coated optical fiber in a state in which each of the rotation axes is tilted at a predetermined angle from a plane perpendicular to the first direction.

2. The method according to claim 1, further comprising adjusting the predetermined angle depending on a mechanical twist of the coated optical fiber.

3. The method according to claim 2, further comprising correcting the mechanical twist on the coated optical fiber, the correcting including
   causing the optical fiber applied with the glass spin to make contact with a surface of a correction roller,
   rotating the correction roller around its rotation axis so that the optical fiber applied with the glass spin is guided in a second direction, and
   applying another glass spin in a direction opposite to a direction of the mechanical twist of the optical fiber applied with the glass spin by tilting the rotation axis of the correction roller at a predetermined angle from a plane perpendicular to the second direction.

4. The method according to claim 1, further comprising correcting a mechanical twist on the coated optical fiber, the correcting including
   causing the optical fiber applied with the glass spin to make contact with a surface of a correction roller,
   rotating the correction roller around its rotation axis so that the optical fiber applied with the glass spin is guided in a second direction, and
   applying another glass spin in a direction opposite to a direction of the mechanical twist of the optical fiber applied with the glass spin by tilting the rotation axis of the correction roller at a predetermined angle from a plane perpendicular to the second direction.

\* \* \* \* \*